US009186671B2

(12) United States Patent
Augstein et al.

(10) Patent No.: US 9,186,671 B2
(45) Date of Patent: Nov. 17, 2015

(54) MICROFLUIDIC TEST CARRIER FOR APPORTIONING A LIQUID QUANTITY INTO SUBQUANTITIES

(71) Applicant: Roche Diagnostics Operations, Inc., Indianapolis, IN (US)

(72) Inventors: Manfred Augstein, Mannheim (DE); Christoph Boehm, Viernheim (DE); Susanne Wuerl, Mannheim (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 13/871,720

(22) Filed: Apr. 26, 2013

(65) Prior Publication Data

US 2013/0236376 A1 Sep. 12, 2013

Related U.S. Application Data

(63) Continuation of application No. PCT/EP2011/067929, filed on Oct. 13, 2011.

(30) Foreign Application Priority Data

Oct. 28, 2010 (EP) .................................... 10189261

(51) Int. Cl.
*B01L 3/00* (2006.01)
*B01J 4/02* (2006.01)

(52) U.S. Cl.
CPC ....... *B01L 3/50273* (2013.01); *B01L 3/502723* (2013.01); *B01L 3/502738* (2013.01);
(Continued)

(58) Field of Classification Search
CPC ................ B01L 2400/0409; B01L 2300/0806; B01L 3/00; B01J 4/02; G01N 35/00069
See application file for complete search history.

(56) References Cited

U.S. PATENT DOCUMENTS

| | | | |
|---|---|---|---|
| 4,154,793 | A | 5/1979 | Guigan |
| 4,426,451 | A | 1/1984 | Columbus |

(Continued)

FOREIGN PATENT DOCUMENTS

| | | | |
|---|---|---|---|
| EP | 0626071 | B1 | 11/1994 |
| EP | 1977829 | A1 | 10/2008 |

(Continued)

OTHER PUBLICATIONS

International Search Report issued Feb. 16, 2012, in Application No. PCT/EP2011/067929, 3 pages.

(Continued)

*Primary Examiner* — Lyle Alexander
*Assistant Examiner* — Dwan A Gerido
(74) *Attorney, Agent, or Firm* — Dinsmore & Shohl LLP

(57) ABSTRACT

A microfluidic test carrier having a substrate, covering layer, and capillary structure formed in the substrate is provided. The capillary structure is enclosed by the substrate and covering layer and comprises a receiving chamber, sample chamber and connection channel between the receiving and sample chambers. The receiving chamber has two boundary surfaces and a side wall, wherein one boundary surface forms the bottom and the other forms the cover. The receiving chamber has a surrounding venting channel and dam between the receiving chamber and venting channel. The dam and venting channel form a capillary stop configured as a geometric valve, through which air from the receiving chamber can escape into the venting channel. The connecting channel between the venting channel outflow and sample chamber inflow controls fluid transport from the receiving chamber into the sample chamber. The capillary stop is configured to prevent autonomous fluid transport from the receiving chamber.

19 Claims, 10 Drawing Sheets

(52) U.S. Cl.
CPC .... *B01L2200/027* (2013.01); *B01L 2200/0605* (2013.01); *B01L 2200/0642* (2013.01); *B01L 2200/0684* (2013.01); *B01L 2200/141* (2013.01); *B01L 2300/0806* (2013.01); *B01L 2300/087* (2013.01); *B01L 2300/0851* (2013.01); *B01L 2400/0409* (2013.01); *B01L 2400/0688* (2013.01)

(56) References Cited

U.S. PATENT DOCUMENTS

| | | | |
|---|---|---|---|
| 5,061,381 | A | 10/1991 | Burd |
| 5,160,702 | A | 11/1992 | Kopf-Sill et al. |
| 6,143,248 | A | 11/2000 | Kellogg et al. |
| 6,395,553 | B1 | 5/2002 | Schembri |
| 6,919,058 | B2 | 7/2005 | Andersson et al. |
| 7,125,711 | B2 | 10/2006 | Pugia et al. |
| 8,486,333 | B2 | 7/2013 | Wang et al. |
| 2002/0036018 | A1 | 3/2002 | McNeely et al. |
| 2004/0206408 | A1 | 10/2004 | Peters et al. |
| 2005/0118070 | A1 | 6/2005 | Griss et al. |
| 2005/0133101 | A1 | 6/2005 | Chung et al. |
| 2005/0169778 | A1 | 8/2005 | Blankenstein et al. |
| 2005/0196328 | A1 | 9/2005 | Fouillet et al. |
| 2007/0134799 | A1 | 6/2007 | Schembri |
| 2008/0254468 | A1 | 10/2008 | Glauser |
| 2009/0155925 | A1 | 6/2009 | Boehm |

FOREIGN PATENT DOCUMENTS

| | | | |
|---|---|---|---|
| WO | 93/19827 | A1 | 10/1993 |
| WO | 95/06870 | A1 | 3/1995 |
| WO | 95/33986 | A1 | 12/1995 |
| WO | 01/46465 | A3 | 6/2001 |
| WO | 2005/119211 | A1 | 12/2005 |
| WO | 2007042219 | A1 | 4/2007 |
| WO | 2007/116909 | A1 | 10/2007 |

OTHER PUBLICATIONS

Madou Marc et al., "Lab on a CD," Annual Review of Biomedical Engineering, 2006, pp. 601-628, retrieved from http://bioenc.annualreviews.org on Apr. 25, 2013.

Notice of Allowance dated Aug. 31, 2015 pertaining to U.S. Appl. No. 13/872,686.

MICROFLUIDIC TEST CARRIER FOR APPORTIONING A LIQUID QUANTITY INTO SUBQUANTITIES

CROSS-REFERENCE TO RELATED APPLICATIONS

This application is a continuation of International Patent Application No. PCT/EP2011/067929, filed 13 Oct. 2011, which claims the benefit of European Patent Application No. 10189261.0 filed 28 Oct. 2010, the disclosures of which are hereby incorporated herein by reference in their entirety.

BACKGROUND

The present disclosure relates to microfluidic test carriers for apportioning a quantity of fluid into sub-quantities.

Microfluidic elements for the analysis of a fluid sample are employed in diagnostic tests for in vitro diagnostics. In such tests, samples of body fluids are tested for one or more analytes contained therein, for medicinal purposes. An important component in the analysis is the test carrier, on which microfluidic channel structures are present for receiving and transporting a fluid sample in order to make it possible to carry out complex, multi-step tests (test protocols).

Test carriers, which are often referred to as a "Lab on a CD" or "Lab on a chip", are made up of a carrier material, which is usually a substrate formed from a plastic. Examples of suitable materials are COC (cyclo-olefin-copolymer) or plastics such as PMMA (polymethyl methacrylate), polycarbonate or polystyrene. The test carriers have a channel structure that is formed in the substrate and is closed by a lid or a covering layer. The channel structure frequently consists of several channels and channel sections as well as interposed chambers that are broadened compared with the channels and channel sections. The structures and dimensions of the channel structures are defined by the structuring of the plastic parts of the substrates and may, for example, be produced by injection molding techniques or other appropriate methods. These also include methods that remove material, such as milling or the like.

Microfluidic test carriers are used, inter alia, for immunochemical analyses with a multi-step test procedure, for example enzyme-linked immunosorbent assay (ELISA) in which, for example, bound or free reaction components are separated. This requires controlled fluid transport. The procedure may be controlled by internal means (inside the fluid element) or external means (outside the fluid element). Control may be based on the use of pressure differences or changes in forces. Frequently, the test carrier is rotated in order to exploit centrifugal forces that are used to obtain control by changing the rotational speed, the direction of turning or the acceleration. Often, a combination of capillary and centrifugal forces are used to control the fluidics.

Analytical systems with rotary test carriers are known from the following publications, for example: European Pat. No. 0 626 071 B1; Int. Pat. Appln. Pub. No. WO 2007/042219 A1; Int. Pat. Appln. Pub. No. WO 01/46465 A2; Int. Pat. Appln. Pub. No. WO 95/33986; U.S. Pat. No. 5,160,702; and Int. Pat. Appln. Pub. No. WO 93/19827

An overview of microfluidic test elements and methods, control thereof, as well as microfluidic test elements as rotating disks, for example in the form of a compact disc (CD), is known from Marc Madou et al., *Lab on a CD,* 8 Annu. Rev. Biomed. Eng. 601-28 (2006) (online at bioeng.annualreviews.org).

Microfluidic test carriers often have a plurality of parallel sub-structures on one test carrier so that different analyses can be carried out in one process sequence. Distributing structures are provided in the test carriers to apportion the fluid into a plurality of identical or differently sized sub-volumes so that users are not obliged to apply small quantities of one sample fluid a number of times. These distributing structures also ensure that the significance of the results is not deleteriously affected by sample application or sampling effects. The same sample material is used for all analyses, which increases the significance, for example when carrying out multiple assays.

The prior art discloses, for example in U.S. Pat. No. 6,919,058 B2, distributing structures in which a fluid is accommodated in an elongated channel in the shape of a plurality of V-shaped structures arranged one behind the other in series. The distributing structure is positioned in a ring on a centrifuging platform. Venting capillaries are provided on the radially inward end of the leg of the V-shaped structure. Outlet capillaries are positioned at the radially outward part of the V-shaped structure, which are provided with a hydrophobic valve. Thus, the fluid is pre-distributed into the individual V-shaped structures on the principle of capillary forces. However, distribution of this type is very slow. After taking the fluid into the V-shaped distributing structure, the test carrier is rotated with acceleration so that the fluid breaks through the hydrophobic stop at a certain frequency and is drained off through the radially outwardly extending outlet capillaries at the base of the V-shaped structure. The fluid is partitioned at the moment of the valve breakthrough. Separation of the pre-distributed fluid portions occurs. Because of the architecture of the radially inwardly located part of the structure in particular, a predetermined volume is drained off. If the structures are the same size, then the volumes that are drained off are identical.

U.S. Pat. No. 4,154,793 discloses a rotary test carrier with a central receiving orifice in the lid. Below the orifice in the lid is a receiving chamber in which fluid is stored. Around the receiving zone are a plurality of peripheral sample chambers which are each connected to the receiving zone via a connecting channel. The inlet orifice for allowing fluid into the sample chamber is at a radially outwardly located position. In order to vent the sample chamber, an outlet orifice is provided that is positioned radially further inwardly than the inlet orifice and which connects the sample chamber to the receiving zone. Rotation of the test carrier empties the fluid contained in the receiving zone into the individual sample chambers, whereupon air flows out of the sample chambers into the receiving zone radially inwards and finally escapes through the central orifice in the lid.

U.S. Pat. No. 7,125,711 B2 discloses a test carrier with elongated distribution channel to which a plurality of metering chambers are connected, which latter are filled by capillary force. Each metering chamber comprises a sub-quantity and has an outlet with a geometric valve. Rotation of the test carrier causes the sub-quantities to empty out of the metering chambers into a sample analysis chamber.

The microfluidic distributing structures known from the prior art for apportioning a quantity of fluid into sub-volumes are particularly suitable for small volumes of up to approximately 10 μL, since the structures are filled entirely "passively" by capillary forces. This also makes the system highly dependent on the fluid properties of the sample, which compromises robustness. With larger volumes, distributing through extensive distributing structures results in significant time delays. This is because as the volumes become larger, the surface area-to-volume ratio of the capillaries becomes less and less favorable, which also results in a reduction in capillary force. In some cases, filling of the capillaries provided for the sub-quantities and the sub-quantity chambers may even come to a stop. Furthermore, with larger volumes, there is a risk that air will flow into the capillaries, which introduces errors into the apportioning and results in volume variations. In general, with distributing systems that function primarily by capillary action, trapped air and foam formation have a major influence on the precision of the sub-volumes that are drained off. This sensitivity of distributing systems that function by capillary action reduces the robustness of the processes (for example analytical processes). The lack of robustness has to be compensated for by external factors, for example by using automatic aliquoting robots. Thus, such known test carriers are only suitable for automatic pipetting of the fluids. Manual pipetting by different users, who are often pressed for time, has an increased tendency to result in (trapped) air bubbles and foam formation when pipetting. The known test carriers are not suitable for manual use. Since, in addition, with the capillary effects discussed here the surface properties of the process are dominant, manufacturing conditions and surface treatment conditions (for example activation, hydrophilization) play a major role. The tight tolerances increase the manufacturing and inspection costs for the test carrier during mass production and can also result in a high rejection rate.

Thus, there is still a great need in the art for the provision of a test carrier with which a quantity of fluid can be apportioned in a reliable manner into predetermined sub-quantities. Such a test carrier should not only be suitable for automatic pipetting and addition of the quantity of fluid, but should also be suitable for manual addition by different users and thus should exhibit enhanced robustness.

SUMMARY

It is against the above background that the present disclosure provides certain unobvious advantages and advancements over the prior art. In particular, the inventors have recognized a need for improvements in microfluidic test carriers for apportioning a liquid quantity into subquantities.

In accordance with one embodiment of the present disclosure, a microfluidic test carrier for apportioning a quantity of fluid into sub-quantities is provided. The test carrier comprises a substrate and a covering layer. A capillary structure is formed in the substrate and is enclosed by the substrate and the covering layer. The capillary structure comprises a receiving chamber, a sample chamber and a connecting channel between the receiving chamber and the sample chamber. The receiving chamber has two opposite boundary surfaces and a side wall. One of the boundary surfaces has an inlet port and one of the boundary surfaces is the floor of the receiving chamber. The other boundary surface is the cover of the receiving chamber. The receiving chamber has a circumferential venting channel and a circumferential dam positioned between the receiving chamber and the venting channel, wherein the dam is closer to the inlet port than to the venting channel. The dam is configured such that a capillary stop forming a geometric valve is formed by the dam and the venting channel through which air can escape out of the venting channel. The connecting channel extends between an outflow orifice of the venting channel and an inlet orifice of the sample chamber such that fluid transport is possible from the receiving chamber into the sample chamber. The valve is configured to prevent automatic fluid transport out of the receiving chamber.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1:
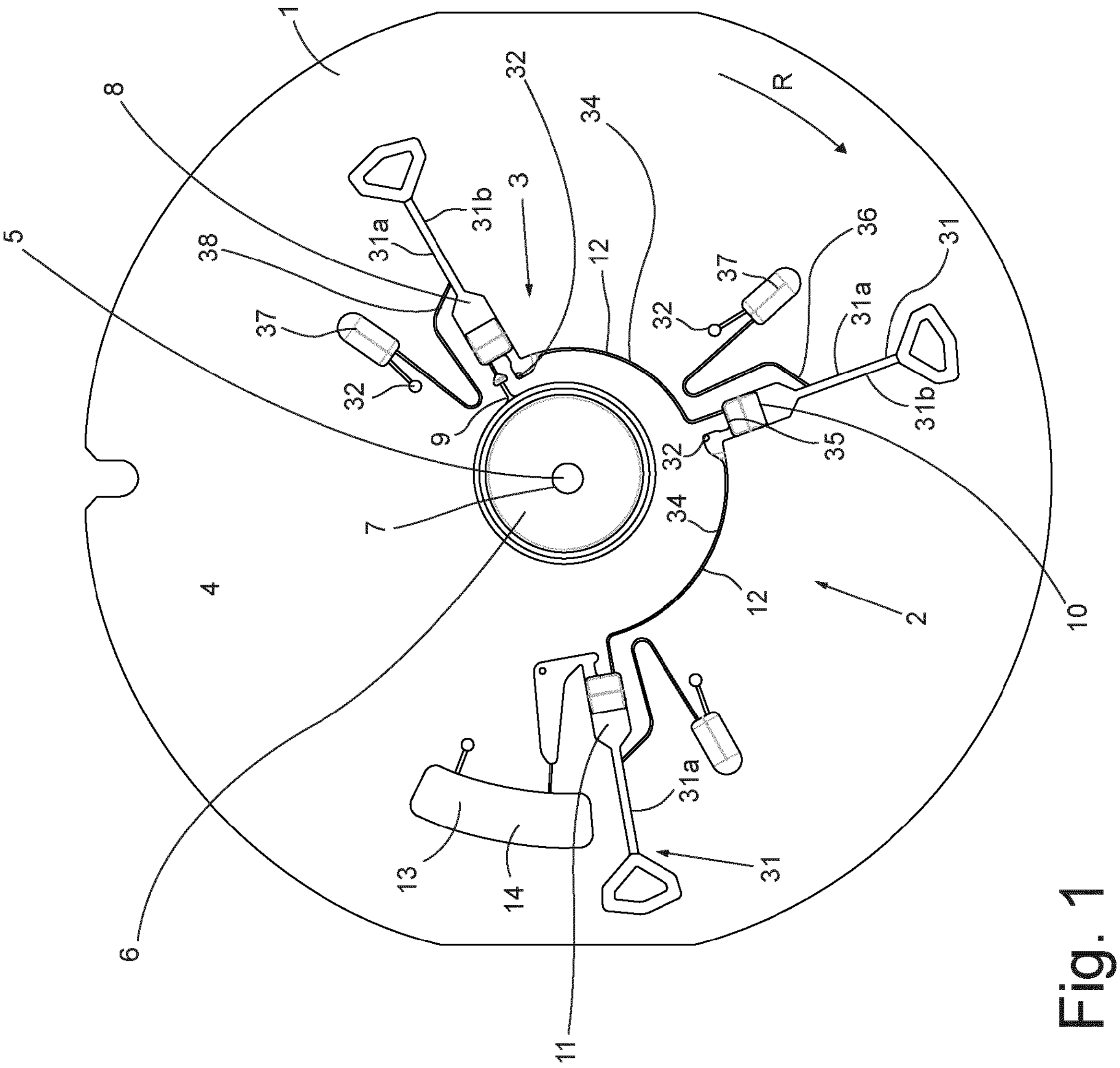
FIG. 1 shows a schematic diagram of a microfluidic test carrier and three sample chambers that are fluidly connected in series.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiment(s) of the present disclosure.

DETAILED DESCRIPTION

The microfluidic test carrier in accordance with an embodiment of the disclosure has a substrate, in which a capillary structure is formed. The capillary structure is enclosed by the substrate and a covering layer. It comprises a receiving chamber to receive a quantity of sample fluid, at least one sample chamber, which has a volume that is smaller than the receiving chamber, and a connecting channel extending between the receiving chamber and the sample chamber. The combination of receiving chamber, connecting channel and sample chamber acts to apportion the quantity of sample fluid into one or more sub-quantities that are smaller than the original quantity of fluid.

The receiving chamber comprises two facing boundary surfaces and a side wall, wherein one of the boundary surfaces is the floor of the receiving chamber and the other boundary surface is the cover of the receiving chamber. The chamber has a circumferential venting channel and comprises a dam (barrier), which is also circumferential, positioned between the inner zone of the receiving chamber and the venting channel. This dam positioned between the venting channel and the receiving chamber is designed and arranged such that it forms a geometric valve together with the venting channel.

The geometric valve is a capillary stop for fluid, but air can escape through it from the receiving chamber into the venting channel. The geometric valve prevents sample fluid from being distributed under capillary action into the adjoining channels unless an external force for controlling the movement or flow of the fluid is applied. Typically, the dam is open at the top so that air can escape from the chamber.

In accordance with an embodiment of the disclosure, the venting channel comprises at least one outflow orifice that is in fluid communication with the connecting channel between the receiving chamber and the sample chamber and provides a connection between the outflow orifice of the venting channel and an inlet orifice of the sample chamber. In this manner, fluid can be transported out of the receiving chamber into the sample chamber, as soon as the fluid has breached the geometric valve formed by the dam and the venting channel. The valve opens when sufficient force is applied to the fluid. As an example, this may be an external force arising from acceleration or rotation. The geometric valve may, for example, be breached when a specific rotational frequency of a rotary test carrier is reached. The dimensions of the capillary stop formed by the geometric valve are such that automatic fluid transport from the receiving chamber, for example by capillary forces, is reliably prevented. When the valve opens, the fluid thus flows out of the inner zone of the receiving chamber through the venting channel into the connecting channel and then into the sample chamber.

The receiving chamber, the venting channel and the dam are constructed such that the inner zone of the receiving chamber lies radially furthest inwardly. If the test element is considered in cross-section, the order of the three components radially from the inside to the outside is such that the receiving chamber is inside the inner zone, then the circumferential dam and the circumferential venting channel is furthest (radially) outwardly. This means that at least sub-regions of the dam and the venting channel lie in a plane which extends parallel to the covering layer of the test element. Thus, the dam forms a side wall of the venting channel.

In this manner, the receiving chamber, acting as a distributing chamber or distributing structure, can be filled initially. This typically occurs when the microfluidic test carrier is stationary. The robustness of the system is increased by the round shape of the receiving chamber and typically by as low a surface area-volume ratio for the receiving chamber as possible. Capillary forces and the surface structure or surface treatments will now have a negligible influence on the robustness of the distributing system. An appropriate choice of the surface-volume ratio of the chamber, wherein the chamber is typically as high as possible, means that even if the sample apportioning is initially irregular, the fluid can then be apportioned as evenly as possible. The usual prior art practice of apportioning, which relies on capillary forces, is not necessary. The quality of the distribution volumes and the regularity of the individual sub-volumes is independent of sample application. In this manner, a high sample application throughput is made possible. When filling the receiving chamber, a fluid sample can flow into the chamber very quickly. Such receiving chambers are particularly suitable for manual pipetting.

In addition, the geometric valve extending at least in parts or in sections along the circumference of the receiving chamber ensures that the distribution of the sample in the receiving chamber does not influence the quality of the apportioned volume compared with the prior art systems described above. Only by applying an additional force to control fluid transport is the geometric valve overcome, and fluid is transported out of the receiving chamber. This architecture means that filling of the receiving chamber is independent of the distribution of the total quantity of fluid into sub-quantities. Filling and distributing into sub-volumes have been completely uncoupled.

In accordance with an embodiment of the disclosure, apportioning the fluid occurs not by capillary forces but by a controlling force, such as centrifugal force. The problems arising from capillary force-reliant distribution of fluid are avoided. Air bubbles are guided radially inwardly upon centrifuging because of their low density. The fluid sample is thus actively vented during aliquotization (distribution), so that included air and foam cannot influence the process, and thus a dominant problem of the prior art is circumvented. The test carrier in accordance with an embodiment of the disclosure thus can be used to apportion a sample fluid in a manner that is not prone to perturbations and is stable and is not dependent on any contamination in the distributing structures or dependent on the surface properties of the distributing structures.

In a typical embodiment, the microfluidic test carrier is a rotary disc, for example a compact disc (CD)-like disc, and rotates about a rotational axis which typically extends through the test carrier. In a typical embodiment, the test carrier is constructed such that the rotational axis extends through the center point or the center of gravity of the test carrier.

In a typical embodiment, emptying the receiving chamber is assisted when it is positioned on the test carrier so that the rotational axis extends through the receiving chamber. Rotation of the test carrier produces a centrifugal force which urges a fluid in the receiving chamber radially outwardly, so that the circumferential dam and the geometric valve formed by it is overcome and fluid can flow into the venting channel. The fluid then flows out of the venting channel through the connecting channel into the sample chamber or apportioning chamber to fill it up.

The present disclosure provides a receiving chamber that enables sample to be applied very quickly. Since in practice, in particular when a user fills a receiving chamber manually, substantially different pipetting speeds can be expected, this guarantees that overflowing of the sample port never occurs. Overflowing would result in contamination of the test carrier surface and, particularly with rotary test carriers, contamination of the apparatus could ensue. In addition, with small volumes and slow pipetting procedures, there is risk that the sample would dry out at the edges. The possibility of being able to carry out pipetting quickly further increases the robustness, accuracy and reliability of the test carrier.

In a typical embodiment, the receiving chamber is constructed such that the surface-volume ratio is as small as possible. Ideally, the receiving chamber should be spherical in construction, as this would mean that the surface-volume ratio would be as low as possible. For a typical chamber volume in the range of 100 μL to 200 μL, for example 160 μL, the surface-volume ratio is 0.9 $mm^2/mm^3$. In the context of an embodiment of the present disclosure, the surface-volume ratio of the receiving chamber should have a value of at most 2.5 $mm^2/mm^3$, typically at most 2 $mm^2/mm^3$.

One of the boundary surfaces of the receiving chamber comprises an inlet port for adding a fluid sample from outside. Typically, the inlet port is positioned in the cover of the receiving chamber. This means that the user can add the fluid sample from above. If the cover of the test carrier consists of a transparent material, at least in the region of the receiving chamber, then the user can observe filling of the receiving chamber. Optical feedback is thus obtained during filling.

With regard to improving filling of the receiving chamber, in accordance with an embodiment of the disclosure, one of the boundary surfaces of the receiving chamber is typically curved. In this case, two different typical embodiments are possible. In the first embodiment, the curved boundary surface of the receiving chamber is the cover. In the other embodiment, the curved boundary surface is the floor. Typically, the floor is curved such that it is inclined upwardly towards the edge of the receiving chamber.

In the microfluidic test carrier of an embodiment of the disclosure with a capillary structure, which comprises a receiving chamber, at least one sample chamber and a connecting channel positioned between the chambers, the quantity of fluid can be apportioned into sub-quantities in two ways. On the one hand, parallel apportioning into a plurality of sample chambers is possible; on the other hand, serial apportioning of the whole quantity of fluid into a plurality of chambers is also possible.

In order to carry out parallel apportioning of the quantity of fluid into a plurality of sub-quantities, the venting channel typically comprises a plurality of outflow orifices, which are each in fluid communication with a connecting channel, which respectively extend from the receiving chamber to a sample chamber. In a typical embodiment, the outflow orifices (outlet ports) are distributed equidistantly on the venting channel, so that even distribution is carried out about the circumference of the venting channel. The individual sample chambers may have the same or different volumes, so that the whole quantity of fluid can be apportioned into the same or different sub-volumes. When the volumes of the sample chambers are the same, (absolutely) identical apportioning of the fluid occurs, either until all of the sample chambers have been filled or the receiving chamber has been emptied. Further channels, chambers or capillary channel structures or transport systems may be connected to the individual sample chambers.

In order to carry out in-series apportioning of the total quantity of fluid into sub-volumes, the venting channel is provided with only one outflow orifice (outlet port), so that a fluid contained in the receiving channel flows through the outflow orifice and the adjoining connecting channel into a first sample chamber. The first sample chamber is connected to at least one further chamber through an outlet channel so that fluid can flow out of the sample chamber into the outlet channel through an outlet orifice of the sample chamber. This chamber may also be a sample chamber, for example. However, it is also possible for this further fluid chamber to be a waste chamber in which surplus fluid is collected. In this manner, the total volume of the sample can be apportioned into a plurality of sample chambers arranged one behind the other. Clearly, one or more of the sample chambers may connect with other (additional) channels, chambers or capillary transport systems or be arranged in parallel.

FIGS. 1 to 10 show embodiments of a microfluidic test carrier 1 in accordance with the present disclosure, which comprises a transport system 2 with a capillary channel structure 3. The channel structure 3 is formed in a substrate 4 formed from plastic. Typically, the capillary structure 3 is produced by injection molding or by a procedure that removes material from the substrate. The test carrier 1 further comprises a covering layer, not shown in FIG. 1, which lies on the substrate 4 such that the channel structure 3 is enclosed by the substrate 4 and the covering layer.

In a typical embodiment, the test carrier 1 is a rotary test carrier that rotates about a rotational axis 5. The test carrier 1 is in the form of a thin disc, for example in the form of a CD. It is held in a rotational device that comprises a rotary shaft that is aligned with the rotational axis 5. In a typical embodiment, the rotational axis 5 extends through the test carrier 1, typically through its center point or its center of gravity.

The capillary structure 3 comprises a receiving chamber 6 with an inlet port 7 through which a fluid sample or a quantity of fluid can be placed in the receiving chamber 6. The fluid sample may, for example, be added by manual or automatic pipetting. The receiving chamber 6 shown here as an example has a volume of 160 μL. In this typical embodiment, the surface-volume ratio is approximately 1.8 $mm^2/mm^3$ and thus is lower than the typical value of 2.5 $mm^2/mm^3$ or 2.0 $mm^2/mm^3$. A receiving chamber 6 with this type of construction can be used for reliable, fast pipetting so that pipetting can also be carried out manually.

The channel structure 3 also comprises at least one sample chamber 8 and a connecting channel 9, which extends between the receiving chamber 6 and the sample chamber 8 and provides fluid connection between the two chambers 6, 8. The connecting channel 9 is formed as a relatively short channel. Typicallly, the length of the connecting channel 9 is in the range of 1 mm to 5 mm, particularly typically in the range of 2 mm to 3 mm. In the example shown here, the length of the connecting channel 9 is 2.7 mm. The cross-section of this channel is typically in the range of 0.01 $mm^2$ to 0.25 $mm^2$. Typical values are 0.09 $mm^2$, for example. The channel shown here has a width of 0.2 mm, for example, and a height of 0.15 mm. Its cross-section is therefore 0.03 $mm^2$. The dimensions of the connecting channel 9 have an influence on complete emptying of the receiving chamber, which should typically be accomplished much more slowly than the regular distribution of the fluid in the receiving chamber 6. In the example shown here, the period for complete emptying of the receiving chamber 6 is approximately six times higher than the period for regular distribution of the fluid (equalization) in the receiving chamber 6. In the present example, complete emptying takes approximately 10 seconds.

FIGS. 1 to 4 show an exemplary embodiment of the test carrier 1 with a capillary structure 3 and three sample chambers 8, 10, 11. The three sample chambers 8, 10, 11 are connected in succession (in series) and each is connected via a channel 12. The three sample chambers 8, 10, 11 form an in-series fluid connection so that a fluid can flow out of the receiving chamber 6 and initially into the sample chamber 8, and from there into the sample chamber 10 and then into the sample chamber 11. A further chamber 13 is connected to the last sample chamber 11, which is constructed as a waste chamber 14 and constitutes a fluid waste reservoir for surplus fluid. The volumes of all of the sample chambers 8, 10, 11 and the waste chamber 14 together are typically approximately that of the volume of the receiving chamber 6, typically somewhat larger.

The three sample chambers 8, 10, 11 in total make it possible for the volume of fluid placed into the receiving chamber 6 to be apportioned into a total of three sub-quantities which are determined by the geometry of the sample chambers 8, 10, 11. Clearly, more sample chambers can also be employed. An embodiment with two sample chambers can also be envisaged.

The sample chambers 8, 10, 11, which are fluidly connected in series, allow a (small) volume of a fluid to be apportioned, which volume is less than the total volume of the three sample chambers. For a smaller volume, a fluid is only divided into one or two chambers, since the sample chambers 8, 10, 11 fill up one after the other and a subsequent sample chamber 10 will only be filled if the preceding sample chamber 8 is completely filled. Thus, it is possible to use the same test carrier for the analysis of several or even only one parameter. This greatly simplifies production, since only one production line and only one tool is required for production of the test carrier, irrespective of whether the test carrier is to be sold as a single parameter or as a multi-parameter test carrier. This type of sample apportioning will also be appreciated by customers, since analyzing one parameter requires only ⅓, or analyzing two parameters, ⅔ of the sample volume. In addition, the same test carrier can be used each time.

The receiving chamber 6 is typically arranged on the test carrier 1 such that the rotational axis 5 extends through the receiving chamber 6. Typically, the rotational axis extends through the inlet port 7, typically through the center point of the inlet port 7 of the receiving chamber 6. The receiving chamber 6 can thus be arranged in the test carrier 1 such that the rotational axis 5 extends through the center point or the center of gravity of the receiving chamber 6. In a typical embodiment, as shown here, the receiving chamber is arranged so as to be eccentric with respect to the center point of the test carrier 1 or its center of gravity. The center point of the receiving chamber 6, which is round (circular) in this case, lies beyond the center point of the test carrier 1. The rotational axis 5 thus does not extend through the center point of the receiving chamber 6. The inlet port 7 which is arranged eccentrically to the receiving chamber 6 is concentric with the rotational axis 5.

Figure 2:
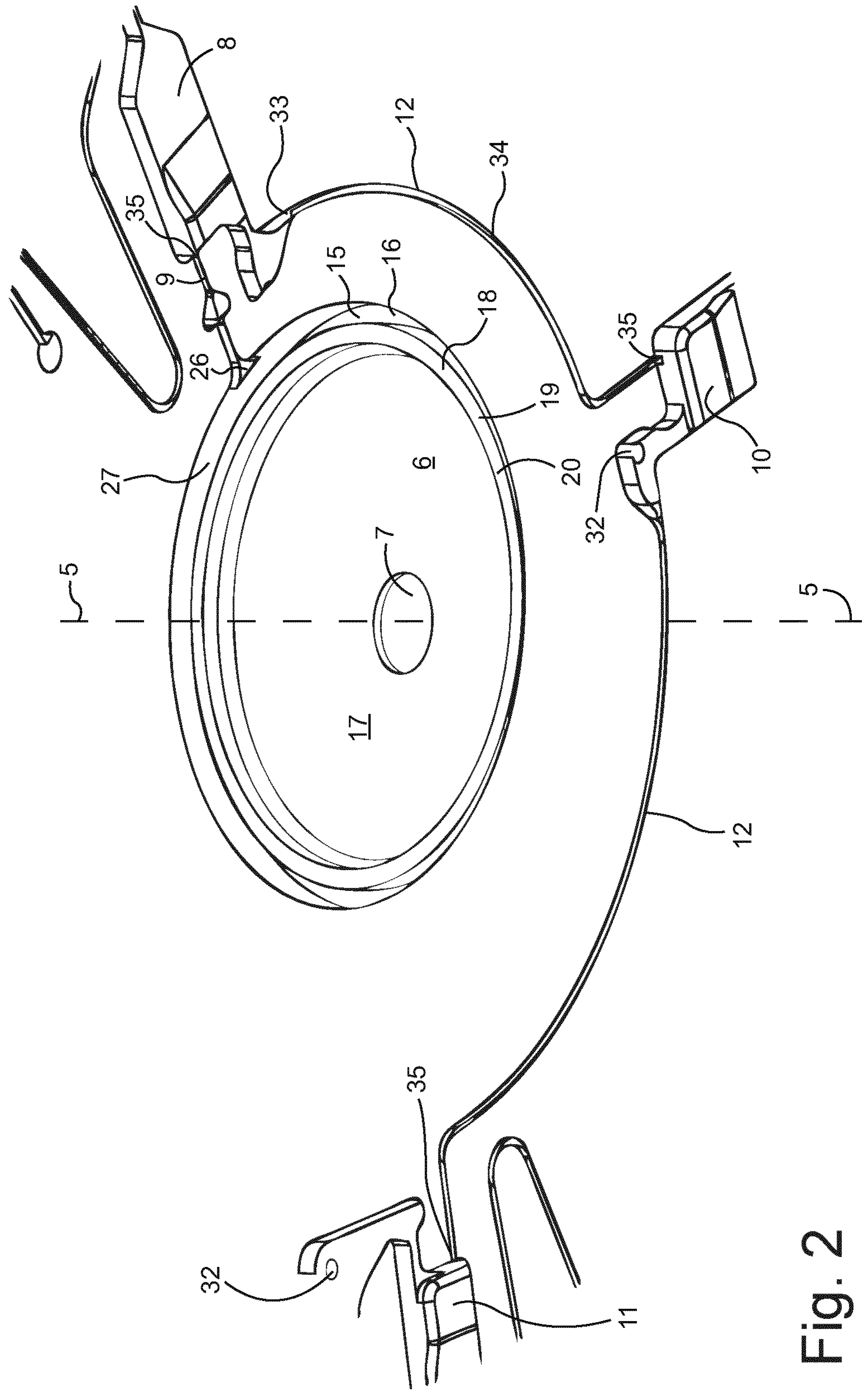
FIG. 2 shows a detailed view of a receiving chamber of the test carrier of FIG. 1.

FIG. 2 shows a detailed drawing of the receiving chamber 6 in a view from below. The inlet port 7 is centrally located in the test carrier 1 and eccentrically located with respect to the center point of the receiving chamber 6. The receiving chamber 6 comprises a circumferential channel 15, which is a venting channel 16. Between the inner zone 17 of the receiving chamber 6 and the circumferential venting channel 16 is a dam 18, which is concentric with the venting channel 16. The dam 18 and the venting channel 16 are positioned at least partially in a plane the normal to which extends parallel to the axis of rotation. The venting channel 16 has a radially inwardly located side wall formed by the dam 18, a radially outwardly located side wall 27 which is the outer wall of the receiving chamber 6, and a floor, which is positioned essentially parallel to the covering layer 21 of the test element. The venting channel 16 may have a constant width and a constant height over its entire circumference. However, its dimensions may vary around its circumference, but typically, however, at least its height is constant. Clearly, the venting channel 16 and/or the dam 18 may be interrupted in parts or sections. In particular, the dam 18 may be interrupted at a plurality of sections, such that a side wall extending to the cover of the receiving chamber is formed. Typically, the dam and/or the venting channel extends over at least 50% of the circumference of the receiving chamber 6, typically over at least 80% of the circumference and particularly typically over at least 90% of the chamber circumference. However, if the venting channel 16 or dam 18 are interrupted, it should be ensured that the geometric valve function formed by them is retained.

The dam 18 is formed by a wall 19 that has a thickness (dimension in the radial direction) which typically corresponds to the width of the venting channel 16 that is associated with it. The height of the wall 19 is less than the height of the (radially outwardly located) side wall 27 of the venting channel 16, so that there is a gap 29 between the covering layer 21 of the test carrier 1 and the top side 20 of the wall 19. The height of the gap is less than the height of the venting channel 16.

Figure 3A:
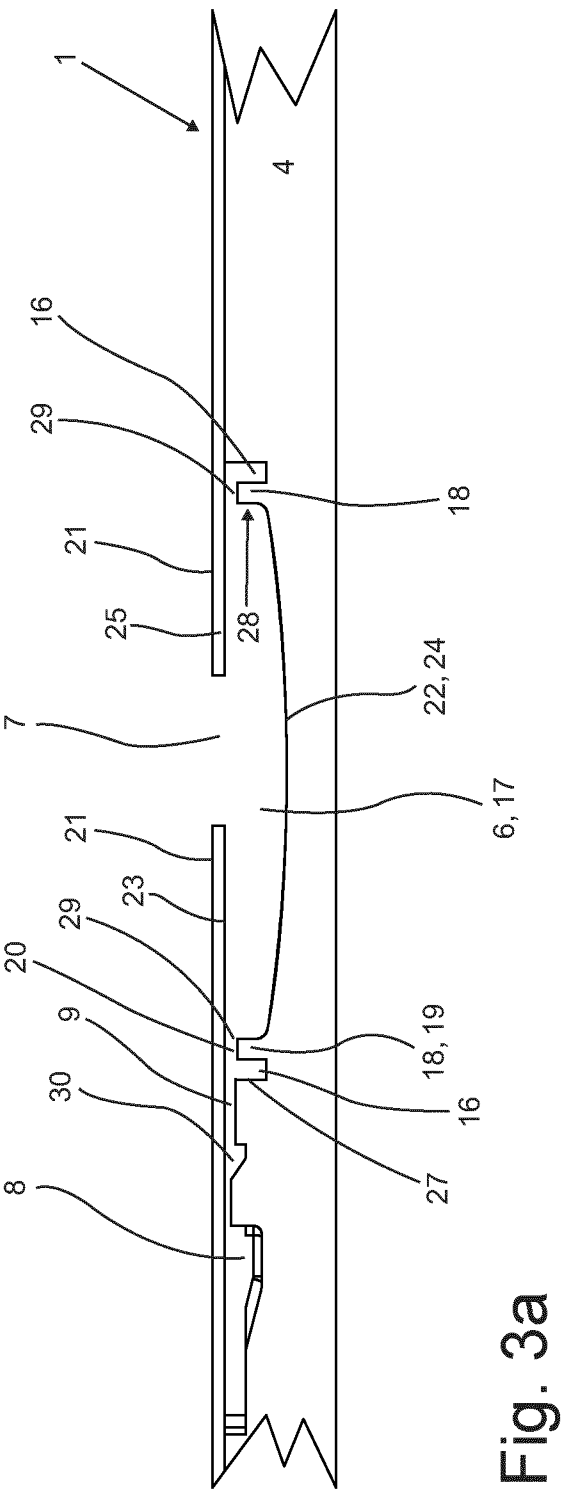
FIGS. 3*a* and 3*b* show two cross-sections through the test carrier of FIG. 1.
Figure 3B:
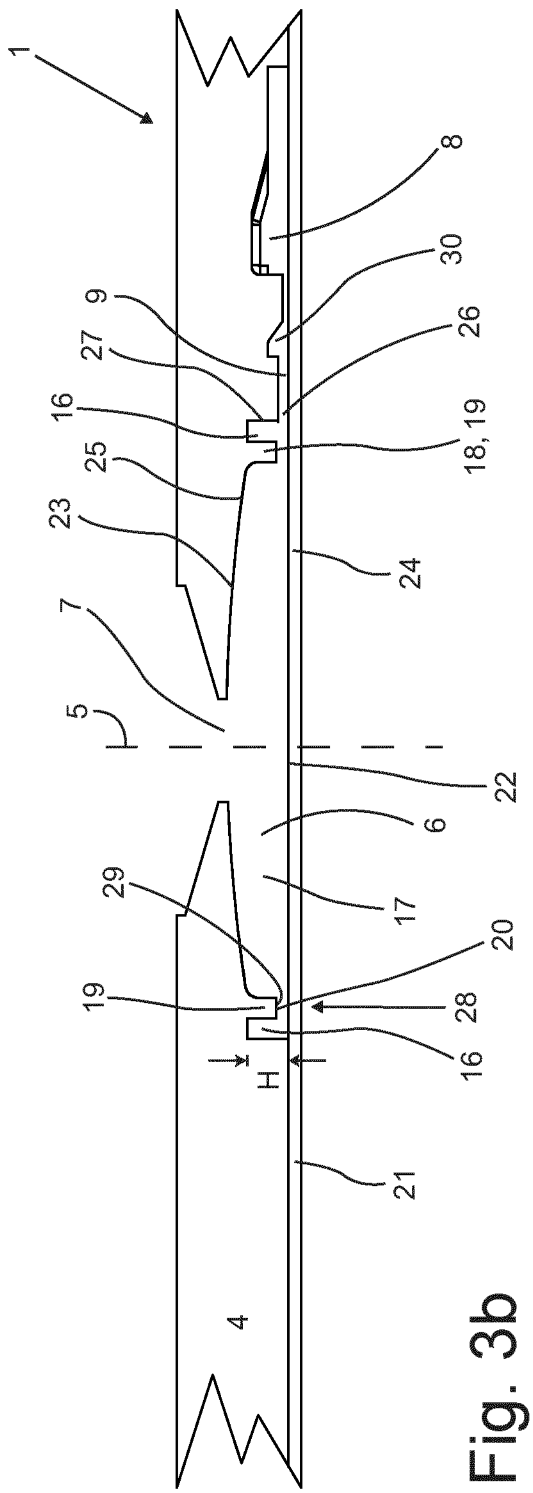

FIGS. 3*a* and 3*b* each show a section through the test carrier 1. The receiving chamber 6 comprises two boundary surfaces 22, 23. The boundary surface 22 is the floor 24 of the receiving chamber 6; the facing boundary surface 23 is the cover 25. In FIG. 3*a*, the floor 24 is formed by the substrate 4. The boundary surface 23 is formed by the covering layer 21, which lies on the substrate 4 of the test carrier 1. In the embodiment of FIG. 3*b*, the cover 25 is formed by the substrate 4, while the floor 24 is the covering layer 21 in contact with the substrate 4.

In a typical embodiment, one of the boundary surfaces 22, 23 of the receiving chamber 6 is curved. In the present example in accordance with FIG. 3*b*, the cover 25 formed by the substrate 4 is curved. The boundary surface 22 forming the floor 24 is flat. The cover 25 comprises a funnel-shaped inlet port 7 through which the fluid to be apportioned is placed in the receiving chamber 6.

FIG. 3*a* shows an embodiment in which the floor 24 is formed as the curved boundary surface 22. The flat covering layer 21 forms the cover 25 and is provided with an inlet port 7. When the covering layer 21 acts as the cover 25 and is a transparent film, then good visual feedback can be obtained when manually pipetting a fluid by observing the volume that has already been metered into the receiving chamber 6. If the inlet port 7 is formed in the substrate 4, visual feedback is also possible if the substrate is transparent, at least in the region of the receiving chamber.

The curved profile of a boundary surface 22, 23 has the advantage that air that enters is guided either by means of a curvature of the cover 25 to the inlet port 7 or by means of a curvature in the floor 24 to the side wall of the inner zone 17. In this manner, air that enters or is pipetted in with the fluid can escape from the receiving chamber 6 and is not trapped in the fluid, possibly producing an error in the volume.

When connecting the sample chambers 8, 10, 11 in series fluidly, the venting channel 16 is provided with exactly one outflow orifice 26. It is typically positioned at the location of the venting channel side wall 27 which, when the receiving chambers 6 are positioned eccentrically, is furthest from the axis of rotation 5. In the embodiment shown, wherein the axis of rotation 5 is concentric with the round inlet port 7, the distance between the outflow orifice 26 and the inlet port 7 is greatest with the position shown in the chamber 6. When the test carrier 1 is rotated, the fluid is forced radially outwardly and collects in the region around the outflow orifice 26. This ensures that all of the fluid exits from the receiving chamber 6, since even the last residues are forced into the outflow orifice 26.

The dam 18 and the venting channel 16 together form a geometric valve 28. Fluid that is to flow out of the receiving chamber 6 into the sample chamber 8 has to flow through the valve 28, i.e., over the dam 18 and through the venting channel 16 in order to get through the connecting channel 9 into the sample chamber 8. The capillary gap 29 formed between the top side 20 of the dam 18 and the facing boundary surface 22 is smaller than the height of the adjoining venting channel 16. In the present example, the capillary gap 29 is formed between the top side 20 and the floor 24, as can be seen in FIG. 3*a*.

Because of the geometric valve 28, when filling the receiving chamber 6, initially only the inner zone 17 and the gap 29 will be filled with fluid. However, fluid does not automatically penetrate into the venting channel 16. Thus, the receiving chamber 6 can be completely or partially filled with the sample fluid or quantity of fluid to be distributed.

Figure 4C:
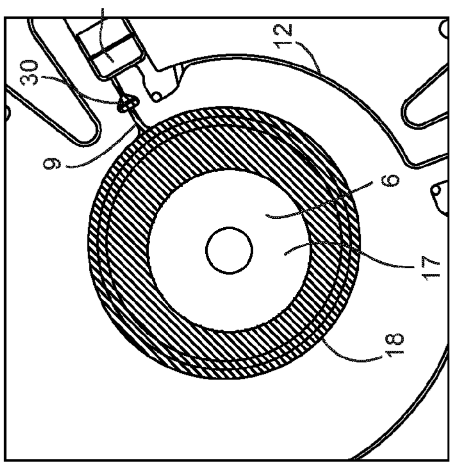
FIGS. 4*a*, 4*b* and 4*c* each show a partial view of the test carrier of FIG. 1 to illustrate filling and apportioning.
Figure 4B:
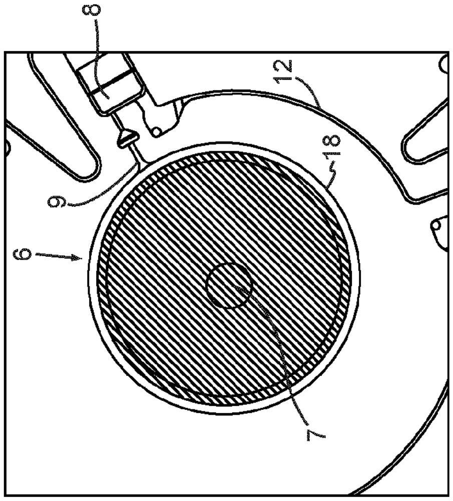
Figure 4A:
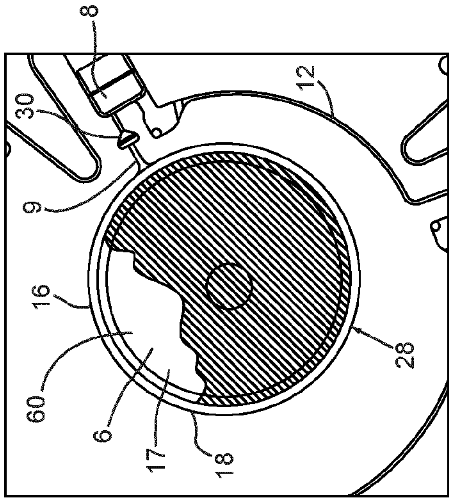
Figure 5:
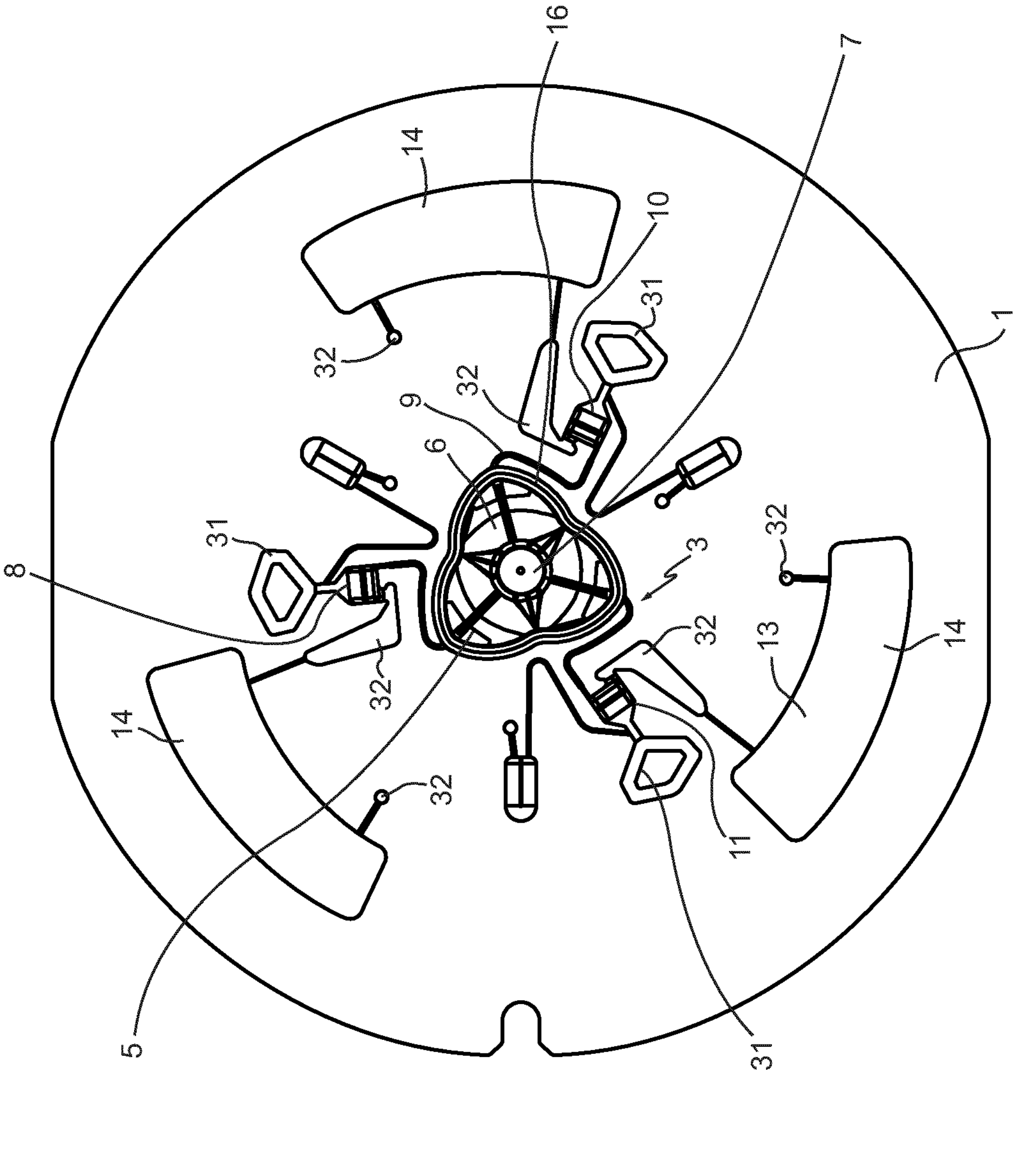
FIG. 5 shows an alternative embodiment of a test carrier for in-parallel apportioning of a fluid sample into a plurality of sample chambers.
Figure 6:
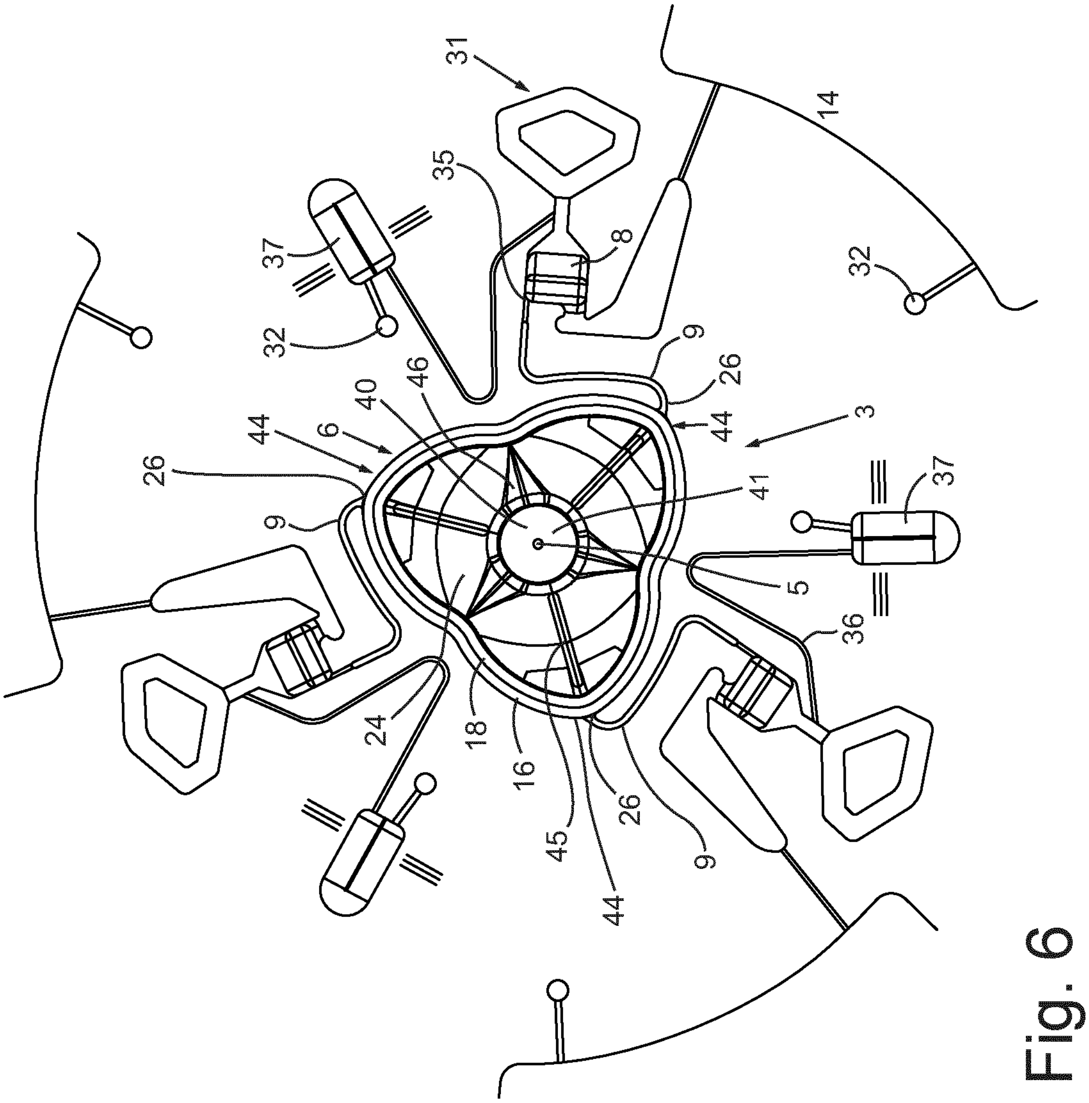
FIG. 6 shows a detailed view of the receiving chamber of the test carrier of FIG. 5.

FIG. 4*a* shows partial filling of the receiving chamber 6, while FIG. 4*b* shows complete filling thereof. Air 60 trapped in the receiving chamber 6 can escape through the geometric valve 28 and via the venting channel 16 into the adjoining connecting channel 9, until it escapes into the environment from one of the venting orifices 32 of the adjoining sample chambers 8, 10, 11 (see FIG. 1).

As soon as the test carrier 1 is rotated and the frequency of rotation exceeds the breakthrough frequency set by the geometry of the geometric valve 28, the geometric valve 28 opens. Fluid flows radially outwardly out of the receiving chamber 6 into the venting channel 16. From this, the fluid enters the connecting channel 9 through the outflow orifice 26, which in the example shown has a further optional geometric valve 30. This geometric valve 30 too is opened by centrifugal force, so that fluid flows into the first sample chamber 8, see FIG. 4*c*.

Upon rotation in the direction of the arrow R (FIG. 1), the fluid is not only guided into the upper portion of the sample chamber 8, but also into its stirrup-shaped chamber structure 31, wherein the fluid is moved along the side wall 31*a* of the chamber structure 31 that faces the direction of rotation. At the facing side wall 31*b* of the chamber structure 31, air can flow out of the structure 31 into the sample chamber 8 and through a venting orifice 32. As soon as the sample chamber 8 is completely filled, fluid goes through an outlet orifice 33 into the adjoining outlet channel 34. The outlet channel 34 is itself connected to an inlet orifice 35 of the adjoining sample chamber 10, so that the fluid can flow into the sample chamber 10.

Since air contained in the chambers can escape from the individual sample chambers 8, 10, 11 through their respective venting orifices 32 into the environment, further flow of the fluid from one sample chamber to the next is only opposed by the flow resistance of the outlet channels 34. The fluid pressure built up by the centrifugal force on leaving the receiving chamber 6 is significantly higher than the flow resistance. Thus, the receiving chamber 6 is emptied completely, whereby excess fluid flows out of the last sample chamber 11 into the adjoining waste chamber 14.

The in-series arrangement of the three sample chambers 8, 10, 11 means that it is not just the total volume formed by the three chambers that can be apportioned. It is also possible to fill the receiving chamber 6 with a quantity of fluid that only corresponds to the volume of the two sample chambers 8 and 10 as well as the connecting channel 9 and the outlet channel 34. In this case, distribution or apportioning or aliquotization of the quantity of fluid is carried out in only two sample chambers 8, 10. If the quantity of fluid in the receiving chamber 6 corresponds to only the volume of one sample chamber 8, then only the first sample chamber 8 is filled. The chambers are thus completely filled. Thus, the volume of one sample chamber and the (essentially negligible) volume of the connecting channel 9 forms the minimum volume for filling the receiving chamber 6.

It is also possible for the receiving chamber 6 to be made substantially larger than the total volume of the three sample chambers 8, 10, 11. This means that the end user can work almost completely without metering. In other words: irrespectively of whether the minimum quantity required by the three sample chambers 8, 10, 11 or the maximum quantity that completely fills the receiving chamber 6 is metered, the (fluid) function of the downstream structures is ensured. In the present example, the volume of each of the three identical sample chambers 8, 10, 11 is 30 μL. The total receiving capacity of the receiving chamber 6 comes to 160 μL. If the receiving chamber 6 is filled with more fluid than the three sample chambers 8, 10, 11 can take, then the surplus fluid is accommodated in the waste chamber 14.

An advantage of the test carrier 1 of an embodiment of the disclosure is that filling of the apportioning structure formed by the receiving chamber 6 is completely decoupled from apportioning or distribution of the fluid (aliquotization) by means of the geometric valve 28. There is no time limit when applying the sample, i.e., when filling the receiving chamber 6, for example by the customer.

Optionally, two or more further chambers can be connected to the receiving chamber 6; further chambers may be connected to these chambers in order to produce a parallel reaction path, for example. These chambers may be separation chambers for separating liquid and cellular sample components, reagent chambers to dissolve a reagent, mixing chambers, waste chambers or other chambers.

In accordance with the present embodiment, when testing blood, liquid and cellular sample components are separated in the stirrup-shaped chamber structure 31 of the sample chambers 8, 10, 11. Thus, a separation takes place in the chamber structure 31. In this manner, it is possible to analyze the remaining blood plasma in the metering chamber 37.

FIGS. 5 to 10 show examples of an alternative embodiment of a test carrier 1 in accordance with the disclosure with an in-parallel fluid connection of, for example, three sample chambers 8, 10, 11 instead of the in-series connection of the sample chambers 8, 10, 11 in accordance with the embodiment of FIGS. 1 to 4. In this embodiment, two or more sample chambers may also be constructed. The essential differences will be explained below:

This in-parallel arrangement is again provided with a central receiving chamber 6; its center point or center of gravity is typically identical with the center point or center of gravity of the test carrier 1. The axis of rotation 5, about which the test carrier 1 rotates, typically extends through the center point of the receiving chamber 6. In a particularly typical embodiment, the inlet port 7 of the receiving chamber 6 is also concentric with the rotational axis 5.

This embodiment has three sample chambers 8, 10, 11 with a stirrup-shaped channel structure 31; they are in in-parallel fluid connection. Each of the sample chambers 8, 10, 11 has a connecting channel 9 to the receiving chamber 6, which respectively extends from an outflow orifice 26 of the venting channel 16 to an inlet orifice 35 of the sample chamber 8, 10, 11. The connecting channel 9 in this embodiment is S-shaped and substantially longer than the connecting channel 9 in the series arrangement as shown in FIGS. 1 to 4. Clearly, even with this parallel arrangement, a shorter, radially outwardly extending connecting channel 9 may be employed. An S-shaped channel 9 could also be used in the in-series embodiment.

The length of the long connecting channel in this example is typically at least 7 mm. Typically, the length is at least 9 mm, particularly typically at least 10 mm. The S-shaped conformation of the elongated channel has the advantage of saving space in the radial direction. Moreover, it provides for as small a radius as possible at the transition into the sample chambers and thus as small a centrifugal force as possible at this location. This also has a positive effect on the rate of emptying—this should be as slow as possible in order to ensure smooth emptying of the receiving chamber 6. For this long channel too, the discussion above regarding the cross-sections applies. Typically, the cross-section should be in the range of 0.01 to 0.25 $mm^2$. In the present example, at the outflow orifice 26 the connecting channel 9 has a cross-section of 0.09 $mm^2$ with a width of 0.3 mm and a height of 0.3 mm. At its end at the inlet orifice 35, the connecting channel 9 is tapered and has a width of 0.2 $mm^2$ and a height of 0.15 mm. Its cross-section is thus 0.03 $mm^2$. With this type of connecting channel, it is possible for the emptying period required for complete emptying of the receiving chamber 6 to be approximately three to four times longer than the period for even distribution of the fluid in the receiving chamber 6, which is also known as equalization. In the parallel conformation of the capillary structure 3, the time for equalization is 1.5 seconds, as it is for the in-series embodiment. Complete emptying in the parallel embodiment takes approximately 5 seconds.

The venting channel 16, with the circumferential radially inwardly lying dam 18, forms a geometric valve 28, which prevents fluid, for example blood, from flowing out by itself. It is only when the valve 30 opens that the fluid can flow into the sample chambers 8, 10, 11. The gap 29 between the top side 20 and the covering layer 21 is smaller than the height of the venting channel 16 adjoining it.

The sample chambers 8, 10, 11 typically each comprise an outlet orifice 33 through which fluid can flow out of the sample chamber 8, 10, 11 into the outlet channel 34. At the end of the outlet channel 34 is a further fluid chamber 13 with an inlet orifice 39, which is in fluid communication with the sample chamber 8, 10, 11. The fluid chamber 13 is typically a waste chamber 14 and accommodates excess fluid. The sample chambers 8, 10, 11 each have a volume of 30 μL; that of the receiving chamber 6 is 160 μL. The volume of fluid from the receiving chamber 6 is apportioned evenly over the sample chambers 8, 10, 11, whereby remaining fluid flows into the respective waste chamber 14.

The receiving chamber 6 can be filled with both the minimum quantity, corresponding to the sum of all of the connecting channels 9 and sample chambers 8, 10, 11, and also can be completely filled, corresponding to the maximum quantity. This ensures that the whole volume of the receiving chamber is smaller than the total volume of all of the sample and waste chambers. Naturally, the receiving chamber 6 can also be filled with any quantity of fluid that is between the minimum and maximum quantity. This provides access to a wide range of fluid for fluid analysis, for example blood or another body fluid. Thus, pipetting and adding fluid, in particular for manual pipetting, is improved and operation is facilitated.

Having regard to the in-parallel arrangement of the sample chambers 8, 10, 11 with which a quantity of fluid can be simultaneously apportioned into sub-quantities, the venting channel 16 comprises a plurality of outflow orifices 26, which are in fluid communication with a respective connecting channel 9. Particularly typically, the outflow orifices 26 are distributed equidistantly, i.e., regularly, about the circumference of the venting channel 16. Typically, the venting channel 16 extends over the whole circumference of the receiving chamber 6.

This is the case for the channel 16 in all of the embodiments of FIGS. 1 to 10. Clearly, with both the in-parallel arrangement and the in-series arrangement, it is possible for sections of the dam 18 and/or the venting channel 16 to be interrupted. Typically, however, the venting channel 16 is not interrupted in the region of the outflow orifices 26.

In the context of an embodiment of the present disclosure, with the in-parallel distribution of the fluid volume, the flow resistance of the distributing capillary formed by the connecting channels 9 can be used as a control tool. With short connecting capillaries with a large cross-section and thus high flow rates, the fluid sample is disrupted, i.e., it has no time to become distributed evenly in the receiving chamber, which results in unequal volumes. The inventive integration of long channels with a small cross-section, which act as flux brakes over their length and slow the distribution process down, means that even distribution into many segments is improved without the need for even capillary pre-distribution. Integration of the connecting channels means that aliquotization (apportioning) can be carried out at higher frequencies (good controllability) and at the same time independently of the position of the sample.

Centrifuging is started up, and a regular apportioning of the fluid in the receiving chamber can be carried out by means of the flow resistance in the connecting channels between the receiving chamber and sample chamber, (without the fluid breaking through into the sample chambers in an uncontrolled manner). The fluid is distributed such that it flows in to the border of the chamber and is positioned at the border of the chamber, while the air of the chamber is positioned in the middle of the chamber (see FIG. 10*c*). This build-up of air in the middle of the chamber is known to the person skilled in the art as a meniscus. The meniscus, which is positioned concentrically about the axis of rotation, results in very accurate aliquotization and thus in volumes in the sample chambers which are as identical as possible.

In contrast to the known distributing structures in the prior art, in which the individual sub-quantity in each sub-structure is dependent on the position of the fluid in the receiving structure or distributing structure, the distribution of the fluid in the test carrier in accordance with an embodiment of the present disclosure is independent of the position of the fluid sample in the receiving chamber. The inventive embodiment of the channel structure thus allows for very precise apportioning of the quantity of fluid and avoids the inaccuracies encountered in the prior art.

Figure 7:
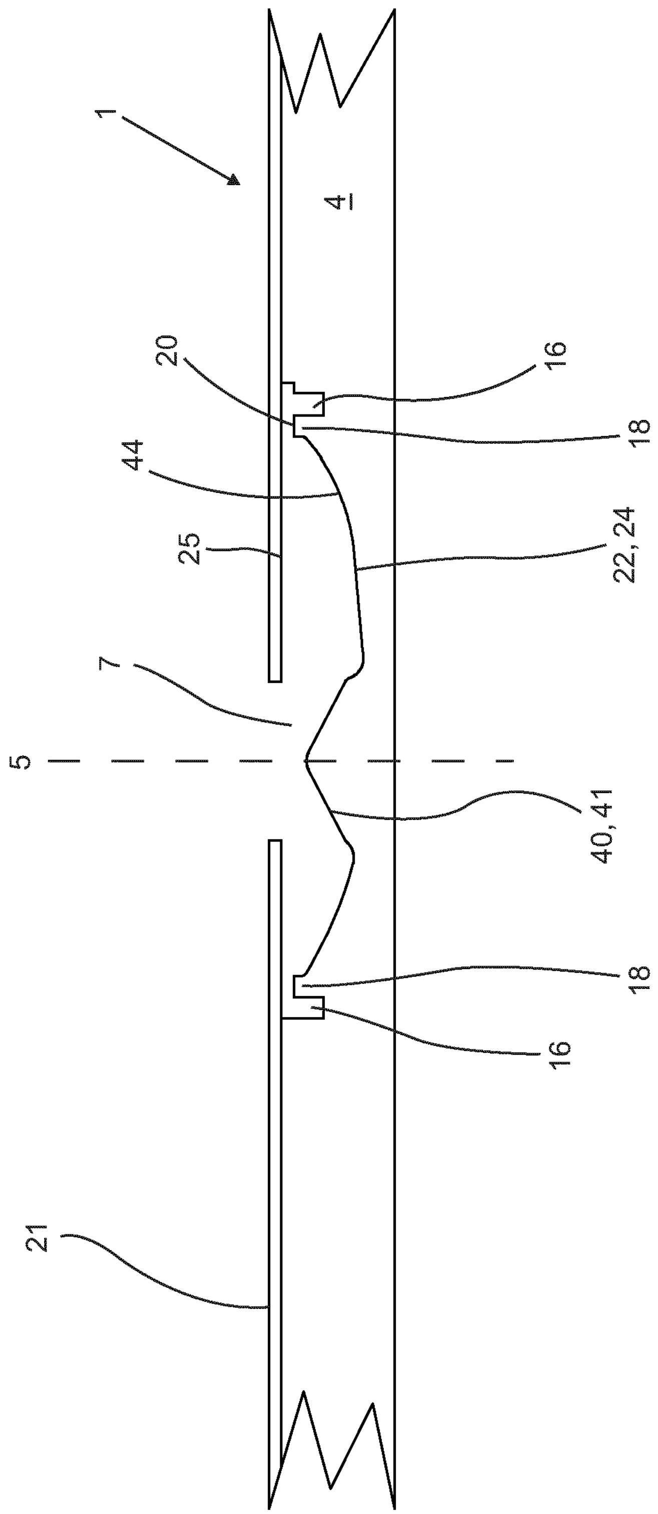
FIG. 7 shows a section through the receiving chamber of FIG. 6.
Figure 8:
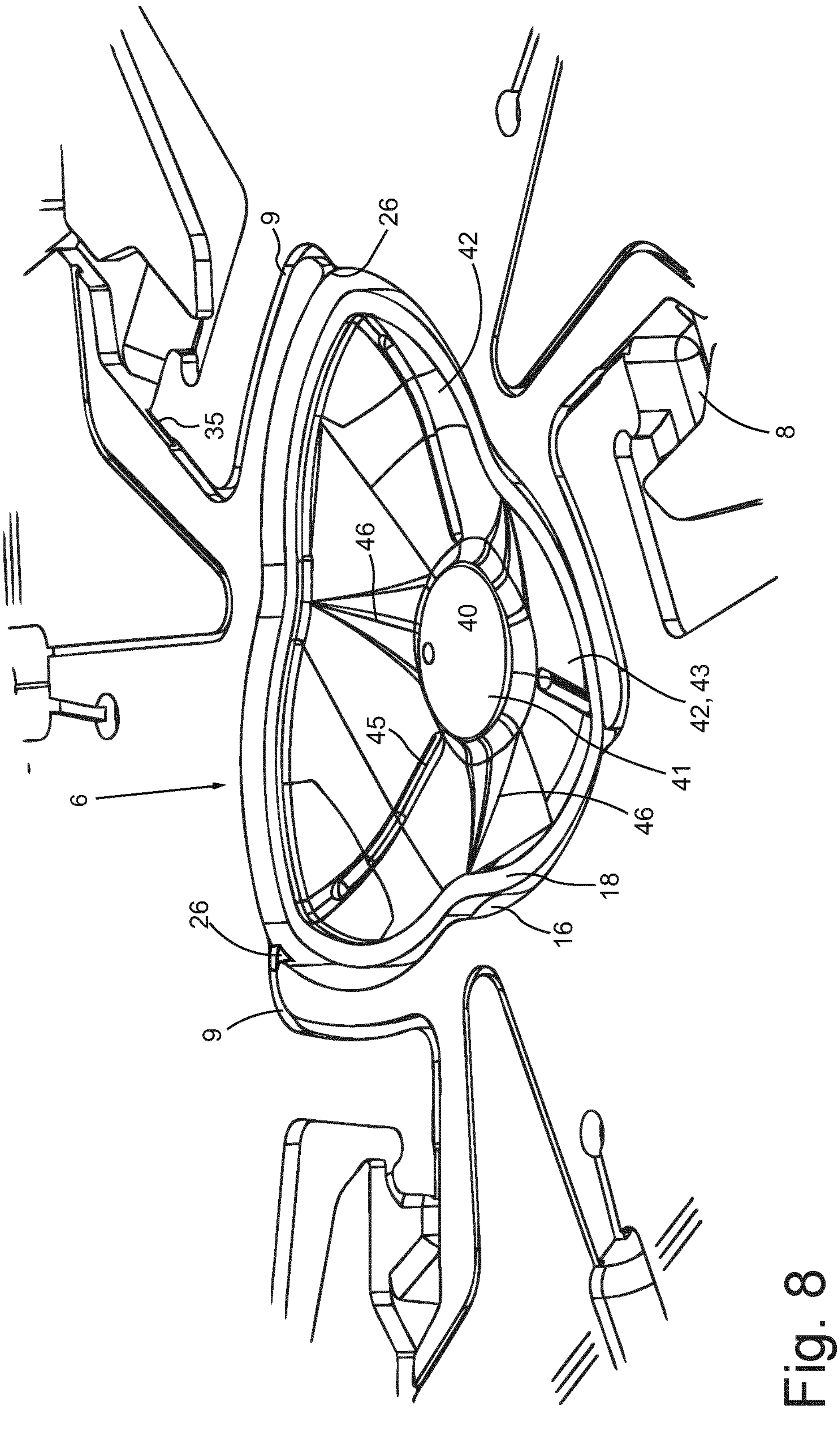
FIG. 8 shows a perspective drawing of the receiving chamber of FIG. 6.
Figure 9:
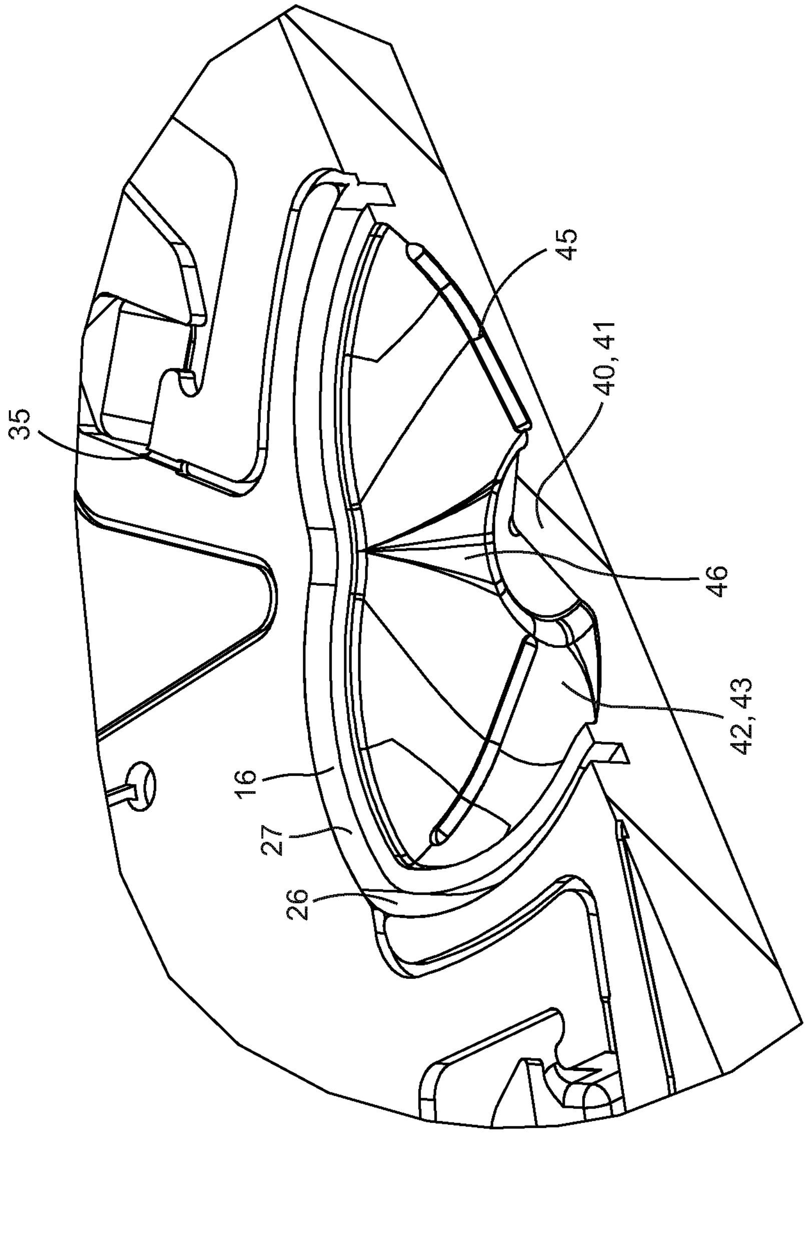
FIG. 9 shows a perspective sectional drawing of the receiving chamber of FIG. 6.

The parallel capillary structure 3 allows for a simultaneous apportioning of the quantity of fluid into the individual sample chambers 8, 10, 11. In particular with in-vitro analyses and tests using blood as a fluid, simultaneous apportioning ensures that the same hematocrit values and the same lipemic fractions of the erythrocytes-to-plasma ratios are obtained in all of the in-parallel chambers. Thus, typically, the floor 24, formed from the substrate 4, is typically curved. FIG. 7 shows that the cover 25 is formed by the flat covering layer 21 and is provided with the round inlet port 7. The circumferential dam 18 and the circumferential venting channel 16 are in this case arranged close to the covering layer 21. They are concentrically arranged and lie in a plane that extends essentially parallel to the covering layer 21. Typically, the curved floor 24 of the receiving chamber 6 is inclined upwardly towards the dam 18. Fluid flowing into the receiving chamber 6 will be positively guided radially outwardly by the resulting capillary action, even when the test carrier 1 is stationary.

Typically, fluid transport in the receiving chamber 6 is aided by a (central) boss 40 on the floor 24. Typically, the boss is conical in shape, as can be seen in FIGS. 6 to 9. The conical boss 40 is typically a cone 41 and is typically arranged facing the inlet port 7 of the cover 25. Typically, the tip of the cone 41 is aligned with the rotational axis 5. Particularly typically, the conical boss 40 may also be formed as a truncated cone. Alternatively, the boss may have a completely different shape, for example a semi-spherical shape, or another shape.

When pipetting a fluid, for example blood, the blood necessarily impinges against the cone 41. Friction between the blood and the substrate 4 of the test carrier 1 influences the flow rate upon pipetting and adjusts to it. Simultaneously, the cone 41 ensures that the blood is retained in the center by adhesion. The rest of the sample flows in the direction of the circumferential dam 18 into the area surrounding the cone 41, this being reinforced by cohesion. The cone 41 thus constitutes a flux brake in the inlet port 7 upon pipetting, which to a certain extent results in normalization of the rate of pipetting. The cone 41 normalizes the various tests and boosts the robustness of the examination system.

In a typical embodiment, the floor 24 of the receiving chamber 6 is dished, such that a depression 43 is formed in a collecting region 42 close to the outflow orifice 26, into which fluid flows and is collected. Typically, a depression 43 is formed in front of each outflow orifice 26. With three sample chambers 8, 10, 11, then, the receiving chamber 6 has three collecting regions 42 and three depressions 43.

In one embodiment, in which the cover 25 of the receiving chamber 6 is curved, the curvature is typically such that it is at its highest at the inlet port 7. In this manner, the fluid flows outwardly and is positively guided from the center of the chamber outwardly (fluid in fact will tend to remain in the center, but outward capillary effects increase).

The curvature of the cover 25 prevents air bubbles from remaining in the chamber, which bubbles come into the chamber with the fluid entering through the inlet port 7 and are, for example, pipetted therewith. The air bubbles are guided to the edge and can then escape from there through the geometric valve 28 into the downstream capillary structures and through their venting orifices.

Typically, the receiving chamber 6 of the test carrier 1 is provided with a lateral indentation 44. Typically, a radially outwardly oriented indentation 44 is located in each collecting region 42. The side wall of the receiving chamber 6, which side wall is formed by the side wall 27 of the venting channel, is indented from the center point of the receiving chamber 6 outwards. In this example, the receiving chamber 6 comprises three radially outwardly extending indentations 44, in each of which the outflow orifices 26 are arranged, to which the connecting channels 9 adjoin the sample chambers 8, 10, 11. As soon as the test carrier 1 is set in rotation, the fluid is urged into the indentations 44 and thus guided directly to the outflow orifices 26.

In order to promote flow of the fluid into the receiving chamber 6 and to provide the fluid with a typical direction, the receiving chamber has a respective groove 45 in the floor 24, which extends radially outwardly. The groove 45 extends from the foot of the cone 41 to the indentation 44. The groove 45 acts to accommodate a hydrophilizing solution during the manufacturing process in order to hydrophilize the receiving chamber 6, which consists of a substrate 4 formed from hydrophobic plastic. Other means or geometric arrangements for hydrophilizing may also be employed.

Because of the depressions 43 positioned in front of the outflow orifices 26, which depressions extend in the direction of the indentations 44, the receiving chamber 6 is provided with radially extending ridges 46 between the individual depressions 43. This configuration of the floor 24 promotes even distribution of the fluid into the individual sample chambers 8, 10, 11.

Figure 10C:
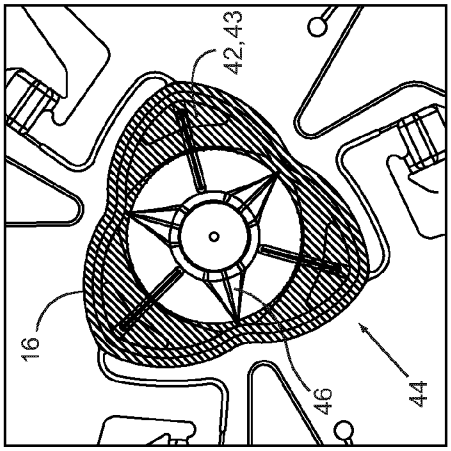
FIG. 10 shows a schematic diagram for filling and apportioning a fluid in the test carrier of FIG. 5.
Figure 10B:
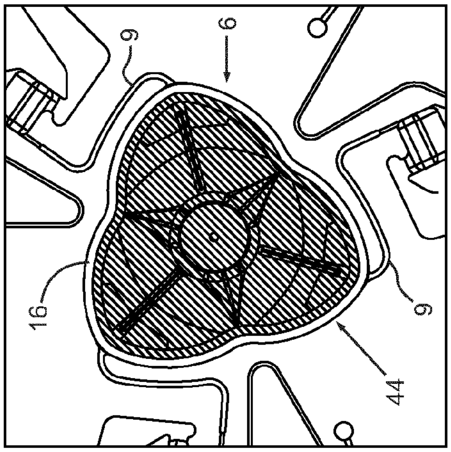
Figure 10A:
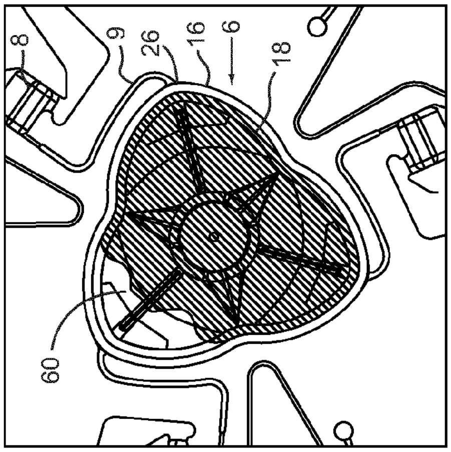

FIGS. 10*a* to 10*c* show filling of the receiving chamber 6 and the distribution of the fluid from the receiving chamber 6 into the individual sample chambers 8, 10, 11 in three steps. FIG. 10*a* shows that when the receiving chamber 6 is partly filled, an air bubble 60 may initially be formed, which in this case is positioned in front of an outflow orifice 26. The air can escape through the venting channel 16 and an outflow orifice 26 positioned therein. Further filling of the chamber until it is full is possible, however (FIG. 10*b*).

FIG. 10*c* shows partial emptying of the receiving chamber 6, after rotation of the test carrier 1 has been commenced and the frequency of rotation (rotational speed) is above the breakthrough frequency of the valve 28 formed by the dam 18 and the venting channel 16. Above this rotational speed, the valve 28 opens up and fluid flows evenly through the outflow orifices 26 into the adjoining connecting channels 9. The fluid is urged into the indentations 44 and into the depressions 43 positioned in the collecting regions 42. If the receiving chamber 6 is emptied further, then separation of the individual collecting regions 42 or the fluid collected in the individual collecting regions 42 occurs. Separation is aided by the ridges 46 (spines) and the indentation 44. In this manner, further regularization of the apportioning of the fluid occurs in the individual sample chambers 8, 10, 11.

Separation of the quantity of fluid in the receiving chamber 6 is particularly advantageous when the connecting channels 9 have a different cross-section. A fluid channel 9 with a larger cross-section would receive more fluid and allow it to flow out more quickly as the quantity of fluid in the receiving chamber 6 was reduced. This is avoided by dividing the fluid into first sub-volumes. The separated quantities of fluid can now only flow out of the associated outflow orifices 28. No fluid can flow out of one depression 43 into a neighboring depression 43.

Even if the distribution of the fluid in the receiving chamber 6 is initially irregular, for example when the receiving chamber 6 is partly filled, the fluid levels out when rotation of the test carrier 1 commences and flows radially outwardly to the border of the receiving chamber 6. By conforming the circumferential dam 18 in the receiving chamber 6, in particular shaping the gap 29, the velocity at which the fluid flows out of the receiving chamber 6 can be adjusted.

By employing a suitable conformation, the fluid flows slowly out of the receiving chamber 6, so that air bubbles in the receiving chamber 6 can be forced out of the fluid even at high rotational speeds and no errors in the volumes arise. This is even true if the air bubbles are pipetted along with the fluid sample. Any foam that forms also does not lead to an error in volume when apportioning the quantity of fluid, since its low density means that it is forced to the inside of the chamber to the inlet port.

Transport of the fluids occurs due to the highly synchronous in-parallel apportioning of the quantity of fluid. Apportioning the fluid into each of the sub-structures having a sample chamber is almost identical. In particular, suspensions and emulsions, which because of their characteristic differences in densities in the centrifugal field, can be apportioned exactly by means of the in-parallel aliquotization, so that each sample chamber exhibits the same particle-fluid ratio or the same fraction of cellular components. To this end, suspensions and emulsions are apportioned with uniform ratios of fluids to solids or fluid to another fluid. Even with blood, this results in analogous ratios for the lipemic fraction of the plasma fraction or the erythrocyte fraction.

It is noted that terms like “preferably”, “commonly” and “typically” are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

For the purposes of describing and defining the present disclosure it is noted that the term “substantially” is utilized herein to represent the inherent degree of uncertainty that may be attributed to any quantitative comparison, value, measurement, or other representation. The term “substantially” is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these preferred aspects.

What is claimed is:

1. A microfluidic test carrier for apportioning a quantity of fluid into sub-quantities, said test carrier comprising:

a substrate and a covering layer, and having a capillary structure formed in the substrate that is enclosed by the substrate and the covering layer, wherein the capillary structure comprises a receiving chamber, a sample chamber and a connecting channel between the receiving chamber and the sample chamber;

the receiving chamber has two opposite boundary surfaces and a side wall, wherein one of the boundary surfaces has an inlet port and one of the boundary surfaces is a the floor of the receiving chamber and the other boundary surface is a the cover of the receiving chamber;

the receiving chamber has an inner zone, a circumferential venting channel, and a circumferential dam positioned horizontally between the inner zone receiving chamber and the venting channel, in which wherein the dam is closer to the inlet port than to the venting channel to the inlet port;

the dam is configured such that a capillary stop forming a geometric valve is formed by the dam and the venting channel, and in which the geometric valve is a capillary stop for fluid, but through which air can escape out of the venting channel; and the connecting channel extends between an outflow orifice of the venting channel and an inlet orifice of the sample chamber such that fluid transport is possible from the receiving chamber into the sample chamber, and in which the valve prevents is configured to prevent automatic fluid transport out of the receiving chamber.

2. The microfluidic test carrier according to claim 1, wherein a center point of the receiving chamber is positioned eccentrically with respect to the center point of the test carrier or to the center of gravity of the test carrier.

3. The microfluidic test carrier according to claim 1, wherein the floor of the receiving chamber is dished such that a depression is formed in a collecting region close to the outflow orifice, into which the fluid flows.

4. The microfluidic test carrier according to claim 1, wherein the side wall is provided with an indentation, which extends away from the center point of the receiving chamber, and the outflow orifice is arranged in the indentation.

5. The microfluidic test carrier according to claim 1, wherein a plurality of outflow orifices are positioned in the venting channel, which are each in fluid communication with a connecting channel that extends away from the receiving chamber.

6. The microfluidic test carrier according to claim 5, wherein the outflow orifices are equidistantly distributed about the circumference of the venting channel.

7. The microfluidic test carrier according to claim 1, wherein the sample chamber is provided with an outlet orifice that is in fluid communication with an outlet channel such that a fluid can flow out of the sample chamber.

8. The microfluidic test carrier according to claim 7, wherein a further fluid chamber with an inlet orifice connects with the outlet channel, which is in fluid communication with the sample chamber by means of the outlet channel.

9. The microfluidic test carrier according to claim 1, wherein one of the boundary surfaces of the receiving chamber is curved.

10. The microfluidic test carrier according to claim 9, wherein the curved boundary surface is the cover of the receiving chamber.

11. The microfluidic test carrier according to claim 9, wherein the curved boundary surface is the floor of the receiving chamber.

12. The microfluidic test carrier according to claim 11, wherein the floor is curved such that the floor is upwardly inclined towards the dam of the receiving chamber.

13. The microfluidic test carrier according to claim 1, wherein the test carrier rotates about a rotational axis that extends through the test carrier.

14. The microfluidic test carrier according to claim 13, wherein the rotational axis extends through the center point or the center of gravity of the test carrier.

15. The microfluidic test carrier according to claim 13, wherein the receiving chamber is positioned in the test carrier such that the rotational axis extends through the inlet port.

16. The microfluidic test carrier according to claim 13, wherein the receiving chamber is positioned in the test carrier such that the rotational axis extends through the center point or the center of gravity of the receiving chamber.

17. The microfluidic test carrier according to claim 13, wherein a boss is formed on the floor of the receiving chamber which is positioned facing the inlet port in the cover.

18. The microfluidic test carrier according to claim 17, wherein the boss is conical.

19. The microfluidic test carrier according to claim 17, wherein the boss is aligned with the rotational axis.

* * * * *